(12) United States Patent
Fuhrmann et al.

(10) Patent No.: US 8,407,175 B2
(45) Date of Patent: Mar. 26, 2013

(54) METHOD, APPARATUS AND PRODUCT FOR SAT SOLVING USING TEMPLATES CLAUSES

(75) Inventors: Oded Fuhrmann, Zichron Yaakov (IL); Ohad Shacham, Kfar Monash (IL)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 12/689,247

(22) Filed: Jan. 19, 2010

(65) Prior Publication Data

US 2011/0178970 A1    Jul. 21, 2011

(51) Int. Cl.
*G06F 17/00* (2006.01)
*G06N 5/02* (2006.01)

(52) U.S. Cl. .......................................... 706/46
(58) Field of Classification Search .................. None
See application file for complete search history.

(56) References Cited

U.S. PATENT DOCUMENTS

| 7,047,139 B2 * | 5/2006 | Shtrichman | 702/22 |
| 2004/0078674 A1 * | 4/2004 | Raimi et al. | 714/33 |
| 2005/0102594 A1 * | 5/2005 | Dey et al. | 714/733 |

OTHER PUBLICATIONS

Satisfiability basedd layout revisited: Detailed routing of complex FPGAs via search based Boolean SAT: Nam, 1999, ACM, 1-58113, 008, pp. 167-175.*

Adaptive application of SAT solving techniques: Shacham, 2005, Elsevier, electronic notes in theoretical computer science 144 (2006) 25-50.*

'Supporting SAT based BMC on finite path models': Geist, 2005, Elsevier, electronic notes in theoretical computer science 144 (2006) 67-77.*

* cited by examiner

*Primary Examiner* — Kakali Chaki
*Assistant Examiner* — Peter Coughlan
(74) *Attorney, Agent, or Firm* — Ziv Glazberg; Glazberg & Applbaum Co.

(57) ABSTRACT

A method to solve a template SAT problem associated with a bounded model that is modeled checked, said method comprising: receiving the template SAT problem, the template SAT problem comprising a plurality of clauses including a template clause that represents a plurality of concrete clauses each associated with a different temporal shift, the template clause is associated with a literal; determining a value of the literal in a cycle based on the template clause and a temporal shift, said determining comprises: determining a concrete clause of the plurality of concrete clauses based on the template clause and the temporal shift; determining a new template clause based on at least two clauses; determining a deduced clause based on at least the value of the literal in the cycle; deducing a solution to the template SAT problem; and outputting the solution.

17 Claims, 3 Drawing Sheets

METHOD, APPARATUS AND PRODUCT FOR SAT SOLVING USING TEMPLATES CLAUSES

BACKGROUND

The present disclosure relates to solving a Boolean satisfiability problem (SAT), also referred to as SAT solving, in general, and to SAT solving of Bounded Model Checking (BMC) problem in particular.

Computerized devices are an important part of the modern life. They control almost every aspect of our life—from writing documents to controlling traffic lights. However, computerized devices are bug-prone, and thus require a verification phase in which the bugs should be discovered. The verification phase is considered one of the most difficult tasks in developing a computerized device. Many developers of computerized devices invest a significant portion, such as 70%, of the development cycle to discover erroneous behaviors of the computerized device, also referred to as a target computerized system. The target computerized system may comprise hardware, software, firmware, a combination thereof and the like.

During the verification phase model checking techniques may be utilized to verify that a property is held by the target computerized system. The target computerized system is represented using a model, defining a state of the target computerized system in each cycle. The state may be affected by a state in a previous cycle, an input to the model, a nondeterministic decision or the like. Some model checking techniques, such as Bounded Model Checking (BMC), utilize a SAT solver. In order to utilize a SAT solver, the model is reduced to a corresponding formula which may be represented by a Conjunctive Normal Form (CNF) formula. A CNF formula comprises of a conjunction of clauses. Each clause comprises a disjunction of literals. Each literal is associated with a Boolean variable and a truth value. The CNF formula may comprise clauses corresponding to constraints associated with an initial state of the model. The CNF formula may comprise clauses corresponding to constraints associated with a verified property checked in the model. The CNF formula may comprise clauses corresponding to transition relation of the model, corresponding to a change between a state and a next state.

BRIEF SUMMARY OF THE INVENTION

One exemplary embodiment of the disclosed subject matter is a SAT solving apparatus having a processor, the SAT solving apparatus comprising: a receiver configured to receive a template SAT problem associated with a model that is modeled checked, wherein the model is a bounded model, the template SAT problem comprises a plurality of clauses, the plurality of clauses comprises a template clause, the template clause represents a plurality of concrete clauses each associated with a different temporal shift, the template clause is associated with a literal; a literal value determinator configured to determine a value of the literal in a cycle based on the template clause and a temporal shift, said literal value determinator comprising: a temporal shifter configured to determine a concrete clause of the plurality of concrete clauses based on the template clause and the temporal shift; a clauses deducer configured to determine a deduced clause, said clauses deducer is configured to utilize said literal value determinator; and a clauses repository configured to retain the plurality of clauses and the deducted clause; a template clause constructor configured to determine a new template clause based on at least two clauses; and wherein said SAT solving apparatus is configured to deduce a solution to the template SAT problem, the solution is selected from the group consisting of a satisfying assignment and a proof of unsatisfiability.

Another exemplary embodiment of the disclosed subject matter is a method to solve a template SAT problem associated with a model that is modeled checked, wherein the model is a bounded model, said method is performed by a computerized device, said method comprising: receiving the template SAT problem, the template SAT problem comprising a plurality of clauses, the plurality of clauses comprises a template clause, the template clause represents a plurality of concrete clauses each associated with a different temporal shift, the template clause is associated with a literal; determining a value of the literal in a cycle based on the template clause and a temporal shift, said determining the value of the literal comprises: determining a concrete clause of the plurality of concrete clauses based on the template clause and the temporal shift; determining a deduced clause based on at least the value of the literal in the cycle; determining a new template clause based on at least two clauses; deducing a solution to the template SAT problem, the solution is selected from the group consisting of a satisfying assignment and a proof of unsatisfiability; and outputting the solution.

Yet another exemplary embodiment of the disclosed subject matter is a computer program product comprising a non-transitory computer readable medium retaining program instructions, which instructions when read by a processor, cause the processor to perform a method comprising: receiving a template SAT problem, wherein the template SAT problem is associated with a bounded model that is modeled checked, wherein the template SAT problem comprising a plurality of clauses, the plurality of clauses comprises a template clause, the template clause represents a plurality of concrete clauses each associated with a different temporal shift, the template clause is associated with a literal; determining a value of the literal in a cycle based on the template clause and a temporal shift, said determining the value of the literal comprises: determining a concrete clause of the plurality of concrete clauses based on the template clause and the temporal shift; determining a deduced clause based on at least the value of the literal in the cycle; determining a new template clause based on at least two clauses; deducing a solution to the template SAT problem, the solution is selected from the group consisting of a satisfying assignment and a proof of unsatisfiability; and outputting the solution.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
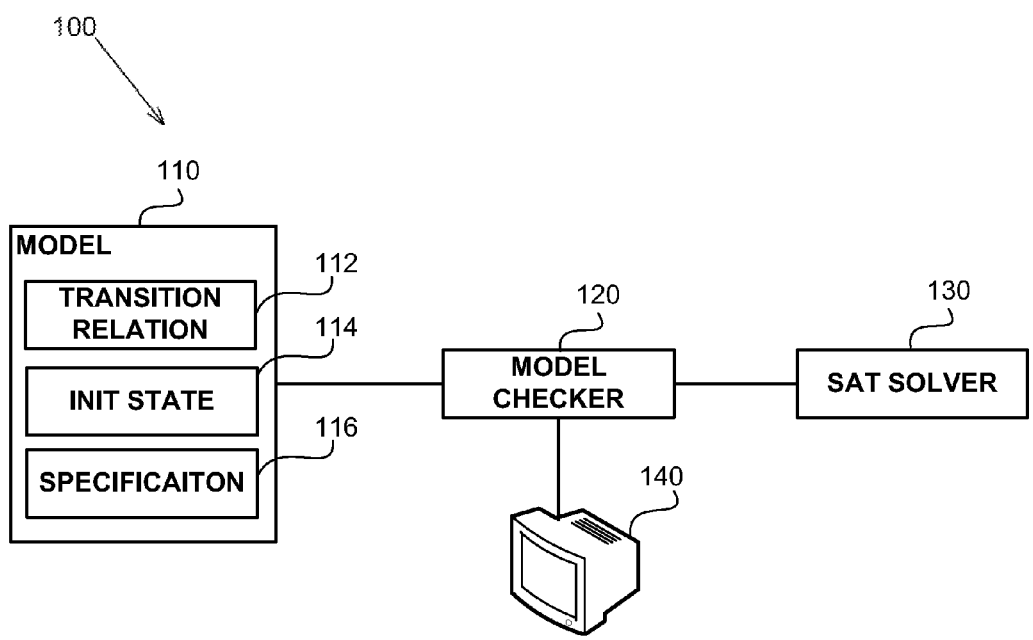
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to perform SAT determination of a model while utilizing a relative small amount of memory resources. Another technical problem dealt with by the disclosed subject matter is to solve a SAT formula based on previous solution of another SAT formula. Yet another technical problem is to utilize a deduction based on a clause to be applicable to additional clauses.

One technical solution is to utilize a template clause, representative of a plurality of concrete clauses. The template clause may represent a clause which is applicable to different cycles of a model. The concrete clause may be represented by a temporal shift and the template clause. Another technical solution is to deduce clauses based upon the template clause. Yet another technical solution is to determine the template clause based upon one or more deduced clauses during the SAT solving operation. Yet another technical solution is to determine the template clause based on a transition relation of a model being modeled checked by a SAT-based model checker.

One technical effect of utilizing the disclosed subject matter is reducing a storage resource required to retain clauses during SAT solving operation. Another technical effect is optionally temporarily retaining the concrete clauses in the SAT solver.

Referring now to FIG. 1 showing a computerized environment in which the disclosed subject matter is used, in accordance with some exemplary embodiments of the subject matter. A computerized environment 100 may comprise a model 110, a model checker 120 and a SAT solver 130.

In some exemplary embodiments of the disclosed subject matter, the model 110 may represent possible behaviors of a target system (not shown), such as a hardware component, a software component, a communication protocol, a business process or the like. The model 110 may be defined by a descriptive language, such as for example SystemC, Verilog, GDL, Sugar or the like. The model 110 may comprise a definition of a transition relation 112, defining a transition from a first state to a second state, such as a next state. The model 110 may comprise an init state 114 defining one or more initial states of the model 110. The model 110 may comprise a specification 116 defining one or more properties that are checked in respect to the model 110. In some exemplary embodiments, the specification 116 may be external to the model 110, such as for example defined by a verification engineer performing verification. In some exemplary embodiments, the model 110 may define behavior in different cycles. The model 110 may define behaviors in an infinite number of cycles. The model 110 may define behaviors in a limited number of cycles.

In some exemplary embodiments, the model checker 120 may perform model checking on the model 110, such as for example by verifying or falsifying that the specification 116 is held by the behaviors defined by the model 110. The model checker 120 may be a Bounded Model Checker (BMC) configured to determine whether the specification 116 is held in a bounded number of cycles in the model 110. The model checker 120 may provide output to a user using a terminal 140. The model checker 120 may be an off-the-shelf model checker. The model checker may be a SAT-based model checker utilizing the SAT solver 130 to perform model checking.

In some exemplary embodiments, the model checker 120 may determine a CNF formula based on the model 110 associated with a behavior of the model 1110 in a bounded number of cycles. The CNF formula may comprise a set of clauses. A portion of the set of clauses may be one or more template clauses. The template clauses may represent each a set of concrete clauses, which may differ from one another by a temporal shift. For example, a portion of the transition relation 112 may be represented by a single template clause which represents a relation between a state and a consecutive state. The template clause may be applicable to several cycles and used to represent the various concrete clauses.

As an example, consider the clause (a_1,!a_2), which represents that in case the value of a variable "a" in cycle 1 is "false" (i.e., the "a_1" literal is "false"), the value of the variable "a" in cycle 2 must also be false (i.e., the "!a_2" literal is "true"). In case the same relation is applicable to other cycles, the template clause (a_1, !a_2) may be used to represent a set of concrete clauses, each associated with different cycles: (a_1, !a_2) with a temporal shift of zero may represent the concrete clause (a_1, !a_2); (a_1, !a_2) with a temporal shift of ten may represent the concrete clause (a_10, !a_11), and the like.

It will be noted that in some exemplary embodiment, a temporal shift may be a shift in a number of cycles applicable to all literals of the clause. In other exemplary embodiments, the temporal shift may be several shifts in a number of cycles, each applicable to a different variable. Other types of temporal shift that map a concrete clause based on a temporal clause may also be utilized.

In some exemplary embodiments, the model checker 120 may determine the template clause based on the transition relation 112. In some exemplary embodiments, the template clause may be based on the specification 116. In other exemplary embodiments, the template clauses may be a conjunction of concrete clauses originating from different aspects of the model 110.

In some exemplary embodiments, the SAT solver 130 may be configured to solve the CNF formula. The SAT solver 130 may determine that the CNF formula is unsatisfiable (also referred to as an UNSAT). The SAT solver 130 may determine a satisfying assignment to the CNF formula (also referred to as a SAT). The SAT solver 130 may utilize the template clauses to solve the CNF formula, by determining concrete clauses based on the template clauses. As the SAT solver 130 may represent the set of clauses using a single template clause, a limited amount of storage may be needed to retain all clauses. As is known in the art, a number of clauses retained by the SAT solver 130 while processing a CNF formula may be significant and hinder ability of a computerized device to determine a SAT or an UNSAT in respect to a CNF.

In some exemplary embodiments, the model checker 120 and/or the SAT solver 130 are implemented in computerized devices such as for example a combination of software and hardware. The model checker 120 and the SAT solver 130 may be executed by a single computerized component of by several computerized components.

In some exemplary embodiments, the SAT solver 130 may provide an output indicating SAT or UNSAT. The output may be provided to a user (not shown), to the model checker 120 or the like. The output may be provided by a print, a display on the terminal 140, a log file or the like.

In some exemplary embodiments, the SAT solver 130 may implement the a search algorithm such as disclosed in M. Moskewicz, C. Madigan, Y. Zhao, L. Zhang, S. Malik, "Chaff: Engineering an Efficient SAT Solver" 39th Design Automation Conference (DAC 2001), June 2001. The algorithm may be, for example, the following:

```
while(1) {
    if (decide_next_branch( ))
        while (deduce( ) == CONFLICT) {
            blevel = analyze_conflicts( );
            if (blevel == 0) retrun UNSAT;
            else backtrack(blevel);
        } else return SAT;
}.
```

In some exemplary embodiments, other search algorithms may be applied. It will be noted that the disclosed subject matter is not limited to this algorithm and may be combined with any SAT solving algorithm.

Figure 2:
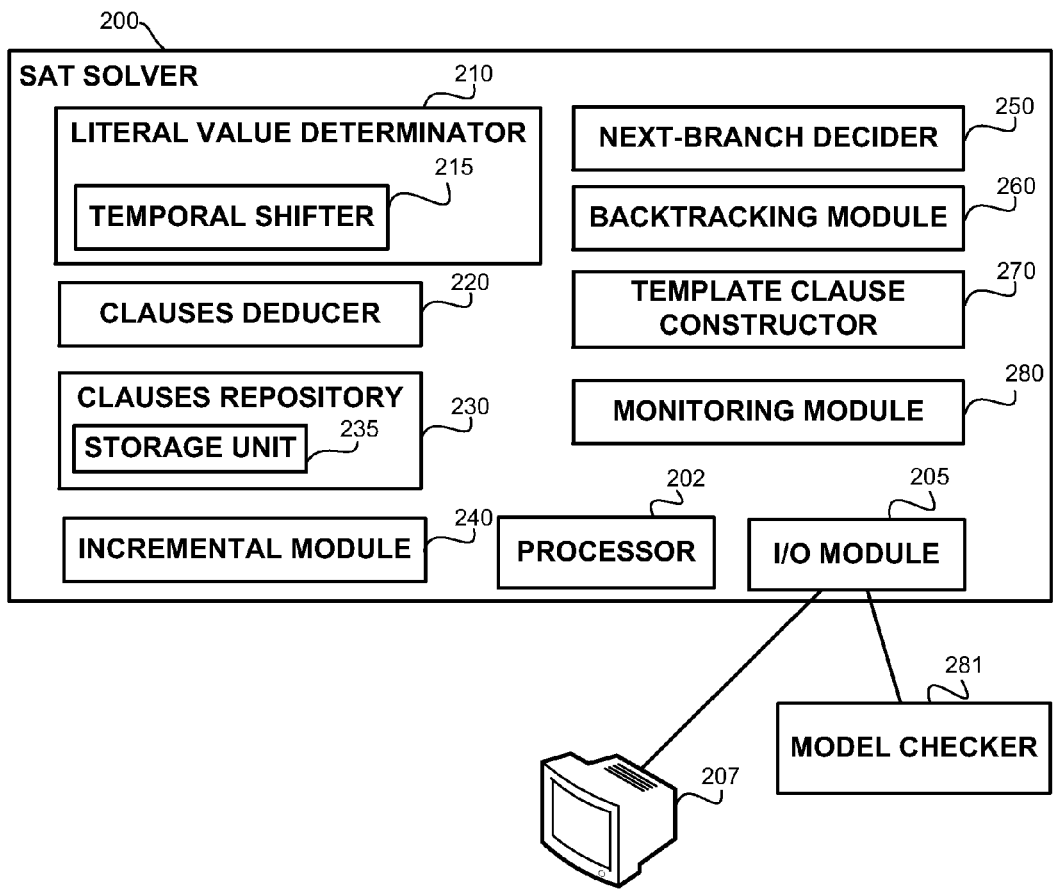
FIG. 2 shows a block diagram of a SAT solver in accordance with some exemplary embodiments of the disclosed subject matter.

Referring now to FIG. 2 showing a SAT solver, in accordance with some exemplary embodiments of the disclosed subject matter. A SAT solver 200, such as 130 of FIG. 1, may be configured to solve a CNF formula (not shown).

In some exemplary embodiments of the disclosed subject matter, the SAT solver 200 may comprise an Input/Output (I/O) module 205. The I/O module 205 may be utilized to receive, retrieve or otherwise obtain a CNF formula to be solved by the SAT solver 200. The I/O module 205 may be utilized to output an indication of a solution (SAT/UNSAT), the solution itself (a satisfying assignment or a set of clauses that cause an unresolveable conflict, also referred to as an UNSAT core). The output may be provided to a terminal 207 or other device of a user (not shown), sent to an address, such as an email address, or otherwise shown to a user. The I/O module 205 may interact with a model checker 281, such as 120 of FIG. 1. The I/O module 205 may receive the CNF formula from the model checker 281, may receive a model from the model checker 281 and determine the CNF formula based on the model or the like. The I/O module 205 may comprise a communication interface, a keyboard, a pointing device, a file system interface, an Application Programming Interface (API), a socket, a terminal or the like.

In some exemplary embodiments, the SAT solver 200 may comprise a processor 202. The processor 202 may be a Central Processing Unit (CPU), a microprocessor, an electronic circuit, an Integrated Circuit (IC) or the like. The processor 202 may be utilized to perform computations required by the SAT solver 200 or any of it subcomponents.

In some exemplary embodiments, a literal value determinator 210 may determine a value of a literal in a cycle based on a template clause and a temporal shift. The literal value may be, for example, "true", "false" or "undecided". The literal value determinator 210 may utilize determine the value of the literal based on a concrete clause determined by a temporal shifter 215. For example, in case the template clause is $(a\_1, b\_2, c\_3)$ and the value of a literal $a\_5$ is desired, an adequate temporal shift may be obtained, such as a shift of 4 cycles to all literals, and the concrete clause $(a\_5, b\_6, c\_7)$ may be determined by the temporal shifter 215. The literal value determinator 210 may determine the value of the $a\_5$ literal based on the aforementioned concrete clause. It will be noted that the concrete clause may be temporarily retained and then disposed of. The concrete clause is not required to be retained, as long as the template clause is retained and represents the concrete clause.

In some exemplary embodiments, a template clause may be retained together with temporal shifts that are associated to the template clause. In some exemplary embodiments, the temporal shifts may be determined in another manner, such as by a mapping function or the like.

In some exemplary embodiments, a clauses deducer 220 may be configured to deduce a clause, also referred to as a deduce clause. The deduced clause is a deduction, as is known in the art, of a clause based on other clauses of the CNF formula. In case a template clause is utilized in order to deduce the deduced clause, the clauses deducer 220 may utilize the literal value determinator 210 in order to determine a value of a literal based on the template clause. In some exemplary embodiments, the clauses deducer 220 may deduce a deduced clause based on a resolution between two or more clauses, as is known in the art.

In some exemplary embodiments, the SAT solver 200, as is known in the art, may determine a value of a literal based on values of other literals in a clause. In case a caluse comprises N literals, and N−1 literals are assigned a "false" value, the additional literal may be determined to be "true". Such a process may be performed iteratively to determine values of literals based on clauses.

In some exemplary embodiments, a clauses repository 230 may be utilized to retain clauses. The clauses repository 230 may utilize a storage unit 235 such as a hard disk, Random Access Memory, a storage server or the like. The storage unit 235 may be a volatile or non-volatile storage unit. In some cases, the storage unit 235 may comprise of a primary memory and a secondary memory, where the primary memory operates faster than the secondary memory. The clauses repository 230 may store original clauses of the CNF formula, deduced clauses deduced by the clauses deducer 220. The clauses repository 230 may retain template clauses. It will be noted that the disclosed subject matter enables the clauses repository 230 to retain the template clause instead of retaining the set of concrete clauses represented by the template clause. Such feature enables reduction in memory usage of the storage unit 235. It is known in the art that in some SAT problems, many SAT solvers will be unable to determine a solution to lack of sufficient resources, one of which is storage. It will be further noted that as a use of the secondary storage increases, a speed of operation of the SAT solver 200 may decrease. Therefore, reduced amount of data retained by the clauses repository 230 may increase performance of the SAT solver 200.

In some exemplary embodiments, an incremental module 240 is utilized to enable performance of incremental SAT problem. For example, in case a first CNF formula solved by the SAT solver 200 is similar to a second CNF formula, the SAT solver 200 may reuse portion of the clauses retained by the clauses repository 230 for the solution of the first CNF formula for solving the second CNF formula. Similar CNF formulas may be extension of a similar BMC model, such as a model for two hundred cycles and a model for five hundred cycles. Similar CNF formulas may comprise common clauses, and deduction based thereof may be reused.

It will be noted that in case a template clause is reused by the incremental module 240, associated temporal shifts may be modified. For example, in case of a CNF formula of a BMC model of ten cycles: INIT && TR^10 && !P, template clause associated with the TR may be used, and it may be associated with ten temporal shifts, one for each cycle of the BMC model. In case of a second CNF formula of the same BMC model but with a different number of cycles, such as twenty, the template clause may be reused with an addition of temporal shifts for each added cycle. In a similar manner, other template clauses that were deduced based on the temporal clause may also be extended.

In some exemplary embodiments, a template clause may be associated with an infinite number of temporal shifts. For example, in case the template clause is associated with an invariant that is applicable to each cycle of the model, the template clause may be associated with an indication that a concrete clause may be determined based on the template clause and any temporal shift. For example, a transition relation of the model may determine that the variable "a" is always "true". Therefore, the template clause (a_1) may be associated with an infinite number of temporal shifts. It will be noted that the CNF formula may be finite and may represent a bounded model. However, representing an infinite number of temporal shifts may still be beneficial in case the incremental module 240 is utilized. It will be further noted that the infinite number of temporal shifts may, in some cases, not include all cycles. For example, every cycle after the third cycle, every other cycle or other similar sets of cycles may be determined and represented by the disclosed subject matter, in accordance with the CNF formula.

In some exemplary embodiments, a next-branch decider 250 may decide a value of a literal or value. The decision may be based on predetermined heuristic. The decision may be of a literal comprised by a template clause and representing a set of literals, each having a different temporal shift. The decision may be of a value to a concrete literal comprised by a concrete clause represented by a template clause. The next-branch decider 250 may utilize the literal value determinator 210.

In some exemplary embodiments, a backtracking module 260 may be utilized in order to revoke a decision by the next-branch decider which causes a conflict between two or more clauses. The backtracking module 260 may utilize the literal value determinator 210.

In some exemplary embodiments, a template clause constructor 270 may be configured to determine a template clause based on two or more clauses. The two or more clauses may be concrete clauses that differ from one another by a temporal shift. The two or more clauses may comprise a template clause, which may be extended to represent, using additional temporal shifts, the two or more clauses. In some exemplary embodiments, the template clause constructor 270 may determine the temporal shift of the template clause based on temporal shifts of other template clauses that were used to deduce the template clause. For example, in case two template clauses having an infinite number of assigned temporal shifts may induce a clause, the template clause constructor 270 may determine a template clause associated with the clause and assign it also with an infinite number of temporal shifts.

In some exemplary embodiments, a monitoring module 280 may be utilized to monitor a conflict induced by a clause of the CNF formula. The monitoring module 280 may be responsive to a modification of a literal being monitored, such as for example initiating the backtracking module 260 in case of a conflict that occurs based on the value of the literal. The monitoring module 280 may comprise of watches of clauses, each watch may be associated with a different literal of a clause which has a "true" value or an "unknown" value. Two watches per clause may provide an efficient method of determining whether a conflict occurs. In case of a template clause, the watch may be associated with a set of temporal shifts, such to represent a watch over a set of concrete clauses. In some exemplary embodiments, other monitoring methods may be utilized to determine whether a conflict occurs due to a decision of a value of a literal.

Figure 3:
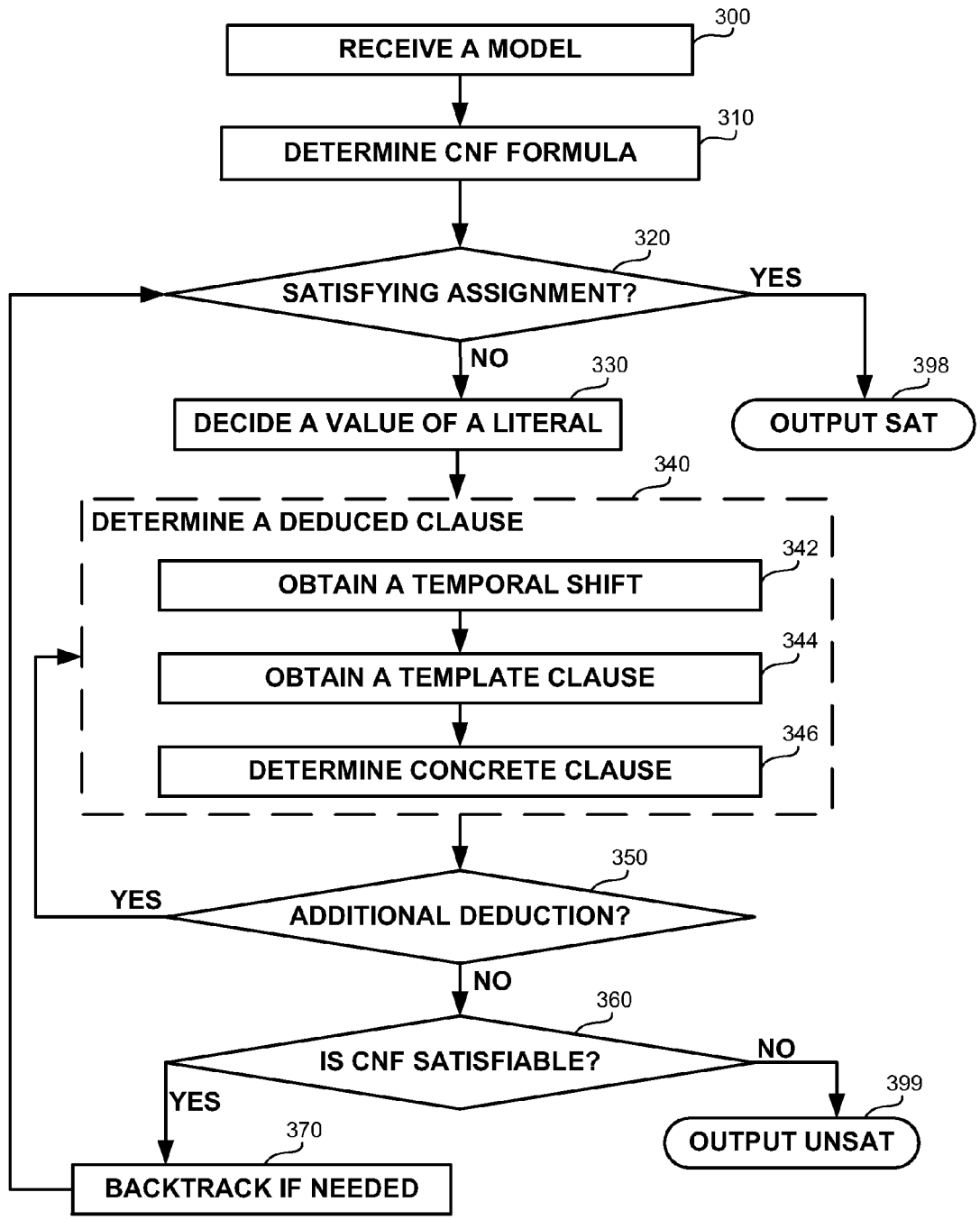
FIG. 3 shows a flowchart diagram of a method in accordance with some exemplary embodiments of the disclosed subject matter.

Referring now to FIG. 3 showing a flowchart diagram of a method in accordance with some exemplary embodiments of the disclosed subject matter.

In step 300, a model, such as 110 of FIG. 1, may be received.

In step 310, a CNF formula may be determined. The CNF formula may comprise BMC related clauses, such as one or more initial clauses, one or more template transition relation clauses, one or more specification clauses or the like. The CNF formula may be determined by a BMC model checker. In some exemplary embodiments, the disclosed subject matter receives the CNF formula instead of a model. Receiving the CNF formula or receiving the model and determining the CNF formula may be performed by a receiver, such as the I/O module 205 of FIG. 2.

In step 320, a determination whether or not a satisfying assignment is available may be performed. The determination may be performed by a SAT solver, such as 200 of FIG. 2.

In response to determining that a satisfying assignment is available step 398 may be performed. In step 398, the satisfying assignment may be outputted by an I/O module such as 205 of FIG. 2. In some exemplary embodiments, merely an indication that the CNF formula is satisfiable is provided.

In case a satisfying assignment is not found, step 330 may be performed. In step 330, a value of a literal may be decided. Step 330 may be performed by a next-branch decider, such as 250 of FIG. 2.

In response to the decision of step 330, step 340 may be performed to determine a deduced clause. In some exemplary embodiments, step 340 is performed by a clauses decducer, such as 220 of FIG. 2. In some exemplary embodiments, step 340 may be invoked by a monitoring module, such as 280 of FIG. 2. For example, in case a value of a watched literal is determined in step 330, the monitoring module may invoke deductions associated to a predetermined clause. Consider the clause (a,b). In case the literal !a is "true", the literal "a" is "false", therefore, and based on the clause (a,b), the literal "b" must be "true".

Step 340 may comprise steps 342, 344, 346. In some exemplary embodiments, deduction of a deduced clause in step 340 is based on a template clause. In step 342 a temporal shift associated with the template clause may be obtained. The temporal shift may be obtained by the monitoring module, based on the literal of step 330, based on other deduced clauses or the like. In a similar manner, a template clause may be obtained in step 344. In step 346, a concrete clause may be determined based on the template clause and the temporal shift. The concrete clause may be utilized to deduce the deduced clause of step 340.

In step 350, a determination whether an additional deduction may be made is performed. In case an additional deduction is possible, step 340 may be performed. Otherwise, step 360 may be performed.

In step 360, a determination is made whether the examined CNF is unsatisfiable. The determination may be performed by a clauses deducer, such as 220 of FIG. 2, by the SAT solver, such as 200 of FIG. 2 or by a conflict analyzing module (not shown). In some exemplary embodiments, the decision made in step 330 may hinder a satisfying assignment to a clause. In such a case, a conflict between two or more clauses may be identified. In some cases, two or more clauses cannot be simultaneously satisfied. Consider the clauses (a) and (!a). If both of these clauses are in a CNF formula, the CNF formula is unsatisfiable, and an UNSAT may be determined. Both these clauses may be comprised by an UNSAT core, as is known in the art. In other exemplary embodiments, an UNSAT determination may be made based on other reasons, such as for example exhausting all possible assignments of values to literals.

In response to a determination of an unsatisfiability of the CNF, step 399 may be performed. In step 399 an UNSAT indication may be outputted. The output may be provided by an I/O module such as 205 of FIG. 2. In some exemplary embodiments, a proof of unsatisfiability may be provided such as for example a graph describing deductions originating from caluses of the CNF formula and resulting in an empty clause. In some exemplary embodiments, an UNSAT core may be outputted.

In step 370, backtracking may be performed. The backtracking may be performed in response to a conflict. The backtracking may revoke one or more decision of literal values determined in step 330. The backtracking may revoke one or more deductions made in step 340. The backtracking may be performed by a backtracking module, such as 260 of FIG. 2.

In response to performing step 370, step 320 may be performed again. In some cases, if backtracking is not performed in step 370, a satisfying assignment to the CNF formula may be determined and the process may terminate in step 398.

It will be noted that as the CNF formula has a finite number of variables and constraints, the process is bound to terminate eventually either in step 398 or in step 399.

However, as the SAT process may be a relatively hard from a computational point of view, the process may take a long while to finish. In addition, a usage of secondary memory or an exhaustion of storage resource may hinder the process from terminating. The disclosed subject matter may reduce an amount of utilized storage by not retaining concrete clauses represented by a template clause.

In some exemplary embodiment, the CNF formula received, obtained or determined in step 310 may be associated with a previous CNF formula, such as for example as is the case in incremental SAT solving. In such an exemplary embodiment the process may further comprise of steps of reusing clauses previously retained. The process may comprise modifying temporal shifts associated with a template clause, such as for example, adding additional temporal shifts to be associated with the template clause, such that the temporal clause may represent additional concrete clauses.

It will be noted that the template clauses disclosed above are not a mere replication of a clause to be applicable to a range of different temporal shifts. Rather, a template clause may be used as a symbolic representation of the set of concrete clauses. A template clause may reduce a size of the CNF formula by requiring a significant small number of clauses to be retained. For example, a single template clause may represent a significant number of concrete clauses, such as for example three hundred.

The disclosed subject matter may be utilized in BMC-based model checking or in other SAT-based techniques, such as for example interpolation, proof-based abstraction refinement or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A SAT solving apparatus having a processor, the SAT solving apparatus comprising:
   a receiver configured to receive a template SAT problem associated with a model that is modeled checked, wherein the model is a bounded model, the template SAT problem comprises a plurality of clauses, the plurality of clauses comprises a template clause, the template clause represents a plurality of concrete clauses each associated with a different temporal shift, the template clause is associated with a literal;
   a literal value determinator configured to determine a value of the literal in a cycle based on the template clause and a temporal shift, said literal value determinator comprising:
      a temporal shifter configured to determine a concrete clause of the plurality of concrete clauses based on the template clause and the temporal shift;
   a clauses deducer configured to determine a deduced clause, said clauses deducer is configured to utilize said literal value determinator; and
   a clauses repository configured to retain the plurality of clauses and the deducted clause;
   a template clause constructor configured to determine a new template clause based on at least two clauses; and
   wherein said SAT solving apparatus is configured to deduce a solution to the template SAT problem, the solution is selected from the group consisting of a satisfying assignment and a proof of unsatisfiability.

2. The SAT solving apparatus of claim 1 further comprising an incremental module configured to reuse a portion of the clauses of said clauses repository in response to said receiver receiving a second template SAT problem, the second template SAT problem is associated with the template SAT problem.

3. The SAT solving apparatus of claim 1, wherein the template clause represents an invariant applicable to each cycle of the model checking problem.

4. The SAT solving apparatus of claim 1 further comprising:
   a next-branch decider configured to determine a value of a second literal of the template SAT problem; and
   a backtracking module configured to revoke a determination made by said next-branch decider.

5. The SAT solving apparatus of claim 4, wherein the value determined by said next-branch decider is associated with the second literal in at least two cycles.

6. The SAT solving apparatus of claim 4, wherein the second literal is the literal.

7. The SAT solving apparatus of claim 1, wherein the at least two clauses comprise the template clause and a second concrete clause.

8. The SAT solving apparatus of claim 1, wherein the at least two clauses comprise at least two concrete clauses.

9. The SAT solving apparatus of claim 1 further comprising a monitoring module responsive to a modification of a value of a second literal associated with a clause retained by said clauses repository.

10. The SAT solving apparatus of claim 1 further comprising a monitoring module responsive to a modification of a value of a second literal associated with the template clause in respect to a first temporal shift; and wherein said monitoring module is further responsive to a modification of a value of a third literal associated with the template clause in respect to a second temporal shift.

11. A method to solve a template SAT problem associated with a model that is modeled checked, wherein the model is a bounded model, said method is performed by a computerized device, said method comprising:

receiving the template SAT problem, the template SAT problem comprising a plurality of clauses, the plurality of clauses comprises a template clause, the template clause represents a plurality of concrete clauses each associated with a different temporal shift, the template clause is associated with a literal;

determining a value of the literal in a cycle based on the template clause and a temporal shift, said determining the value of the literal comprises:

determining a concrete clause of the plurality of concrete clauses based on the template clause and the temporal shift;

determining a deduced clause based on at least the value of the literal in the cycle;

determining a new template clause based on at least two clauses;

deducing a solution to the template SAT problem, the solution is selected from the group consisting of a satisfying assignment and a proof of unsatisfiability; and outputting the solution.

12. The method of claim 11 further comprising:
retaining the deduced clause in a storage device of the computerized device; and
retaining the plurality of clauses in the storage device.

13. The method of claim 11 further comprising:
receiving a second template SAT problem, the second template SAT problem is associated with the template SAT problem; and
deducing a solution to the second template SAT problem based on the deduced clause.

14. The method of claim 11, wherein each two clauses of the at least two clauses differ from one another in a temporal shift.

15. The method of claim 11, wherein the new template clause is associated with all cycles of an unbounded variation of the bounded model.

16. The method of claim 11 further comprising:
determining a value of the literal based on the template clause in respect to at least two cycles; and
revoking determination of said determining a value of the literal.

17. A computer program product comprising a non-transitory computer readable medium retaining program instructions, which instructions when read by a processor, cause the processor to perform a method comprising:

receiving a template SAT problem, wherein the template SAT problem is associated with a bounded model that is modeled checked, wherein the template SAT problem comprising a plurality of clauses, the plurality of clauses comprises a template clause, the template clause represents a plurality of concrete clauses each associated with a different temporal shift, the template clause is associated with a literal;

determining a value of the literal in a cycle based on the template clause and a temporal shift, said determining the value of the literal comprises:

determining a concrete clause of the plurality of concrete clauses based on the template clause and the temporal shift;

determining a deduced clause based on at least the value of the literal in the cycle;

determining a new template clause based on at least two clauses;

deducing a solution to the template SAT problem, the solution is selected from the group consisting of a satisfying assignment and a proof of unsatisfiability; and outputting the solution.

* * * * *